United States Patent [19]

LaBar

[11] 3,879,210

[45] Apr. 22, 1975

[54] FUSED-CAST REFRACTORY

[75] Inventor: Richard Gary LaBar, Youngstown, N.Y.

[73] Assignee: The Carborundum Company, Niagara Falls, N.Y.

[22] Filed: June 14, 1972

[21] Appl. No.: 262,830

[52] U.S. Cl. ................................................. 106/65
[51] Int. Cl. ............................................. C04b 35/10
[58] Field of Search ....................................... 106/65

[56] References Cited
UNITED STATES PATENTS
2,695,849  11/1954  McMullen............................ 106/65

*Primary Examiner*—J. Poer
*Attorney, Agent, or Firm*—David E. Dougherty; Herbert W. Mylius

[57] ABSTRACT

An improved high alumina fused-cast refractory which has a composite structure of massive primary corundum bonded with a refractory aluminum borosilicate glass. Articles formed from this refractory demonstrate superior resistance to corrosive and erosive conditions encountered in high temperature applications as well as resistance to deformation and cracking. The preferred composition of the refractory comprises about 99 weight percent of alumina, with about 0.5 weight percent each of boric oxide and silica. Small amounts of other metallic oxides will adversely effect the properties of the refractory if they are present in amounts of more than 0.3 weight percent.

4 Claims, 2 Drawing Figures

INTERLOCKING CORUNDUM W/INTERGRANULAR ALUMINUM BOROSILICATE GLASS

FUSED-CAST REFRACTORY

BACKGROUND OF THE INVENTION

The manufacture and use of fused-cast refractory products has been fraught with various difficulties and problems which have not been altogether met and overcome by the fused-cast refractory compositions heretofore available. In addition to having resistance to corrosion and erosion by molten glass, metals, slags, ores, and hot vapors, at the customary high temperatures encountered in various types of furnaces, smelters and reactors during their operation, a satisfactory fused-cast refractory composition should also possess the following properties or characteristics.

First of all the composition should be one which will furnace without difficulty to form a satisfactorily large molten bath of material which will remain sufficiently fluid during the casting operation to permit the formation of well-formed, relatively smooth surfaced castings of the desired shape. Also, the fused-cast composition should be capable of cooling to the solidified form without cracking or developing lines of weakness, and upon solidification the fused-cast article should preferably be relatively dense and as nonporous as possible. The resulting fused-cast refractory article should also be resonably resistant to breakdown when subjected to heat stress and should undergo a minimum of change when subjected to high temperatures over prolonged periods of time, further, the resulting refractory article should also be resistant to attack by metallurgical ores, slags, vapors, gases and alloys when exposed to any combination of these.

SUMMARY OF THE INVENTION

The invention provides a substantially crack-free corrosion and thermal shock resistant fused-cast refractory article with a crystal structure comprising crystals of corundum bonded by a refractory aluminum borosilicate glass. The refractory comprises about 98 to about 99 weight percent alumina, about 0.25 to about 1 weight percent boric oxide and about 0.25 to about 1 weight percent silica. Small amounts of other metallic oxides may be present if they constitute less than 0.3 weight percent of the refractory.

DETAILED DESCRIPTION

It has been discovered that fused-cast refractory articles, comprising from about 98 to about 99 weight percent of alumina, combined with about ¼ to about 1 weight percent each of boric oxide and silica, provide articles with superior resistance to corrosion by molten glasses, metallurgical slags, molten ferrous and nonferrous metals, metallurgical vapors and gases. This same fused-cast refractory also provides excellent resistance to mechanical and thermal stress failure at very high as well as low temperatures.

The successful manufacture and high performance of the refractory of this invention are dependent on a unique microstructure which is in turn dependent on a specific combination of alumina, silica and boric oxide plus small amounts of accessory constitutents, namely the oxides of hydrogen, lithium, sodium, potassium, calcium, magnesium, titanium, chromium, iron, zirconium and the like. It has been determined, however, that the total of these accessory oxides should be less than about 0.3 weight percent of the refractory.

While the components of the refractory mixtures should be reasonably pure, commercially available materials may be used. The analyses of the alumina, silica and boric oxide used in the refractories of the invention are given in Table 1.

TABLE I

Typical Analyses of Commercial Raw Materials

| | Bayer Alumina (wt. %) | Silica Sand (wt. %) | Boric Oxide (wt. %) |
|---|---|---|---|
| $Al_2O_3$ | 99.6 | 0.10 | |
| $SiO_2$ | 0.2 | 99.88 | |
| $Fe_2O_3$ | 0.06 | 0.02 | 0.03 |
| $Na_2O$ | 0.05 | | |
| CaO | 0.08 | 0.02 | |
| MgO | | | |
| $TiO_2$ | 0.005 | 0.15 | |
| $B_2O_3$ | — | — | 98.5 |
| (Loss on Ignition) | 0.35 | 0.02 | 1.4 |

Figure 1:
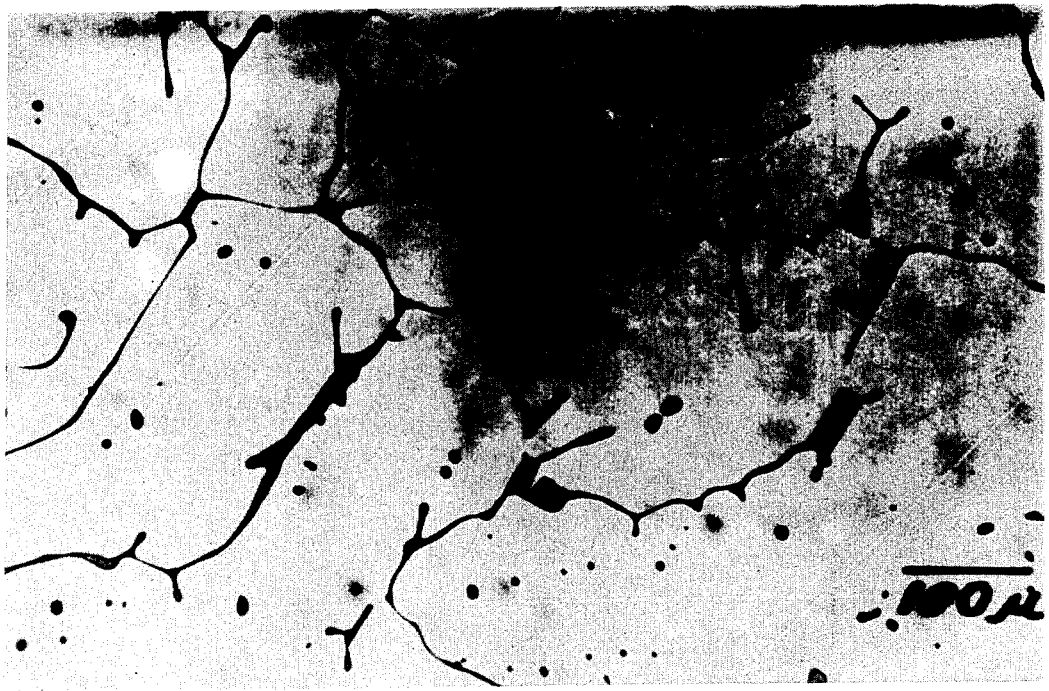
FIG. 1 is a photograph of the microstructure of the refractory, showing the primary corundum grains surrounded by a thin film of aluminum borosilicate glass.

While the refractories of the invention may comprise from about 98 to about 99 weight percent alumina, the preferred composition comprises about 99 weight percent alumina with about 0.5 weight percent boric oxide and 0.5 weight percent silica. After fusion, the resulting castings may contain from about 0.4 to about 0.9 weight percent silica and about 0.3 to about 0.7 weight percent boric oxide, depending on the conditions of melting and sampling of the casting. The refractory microstructure comprises crystalline corundum and is preferably composed of large interlocking crystals of alpha-alumina or corundum and nearly continuous intercrystalline bonding film of an aluminum borosilicate glass. This structure is illustrated in a photograph in FIG. 1. Deviations from the preferred combination of raw materials and recommended melting conditions result in insufficient intercrystalline glass, intercrystalline silicates, alumino-silicates or excessive porosity.

The weight ratio of boric oxide to silica is important. If this ratio in the glass component of the refractory is less than one, the corundum morphology or crystal structure is still interlocking but the ability of the glass to deform during annealing is not sufficient to prevent crack formation during cooling. The severity of the cracking increases with a decrease in this ratio with a value of 0.4 being the minimum. When the ratio is larger than 1.5, the structure tends to be blocky rather than interlocking with very large corundum crystals which lead to high internal stresses set up by intercrystalline, differential (anisotropic) expansion. Internal strains of this sort cause cracking in the refractory article.

If the boric oxide is replaced partially or totally by glass fluxing or modifying oxides such as those of sodium, potassium, calcium, magnesium, chromium, phosphorus, zirconia, etc., the resultant intercrytalline glass or precipitated crystalline silicates, alumino silicates or baddeleyite produces a composite which does not consist of interlocking alpha-alumina crystallites and in which the incompatibility of the various phases is manifest by poor thermal stress resistance, poor thermal stability, poor corrosion resistance or a possible combination of these undesirable characteristics. These effects are indicated by some of the examples shown in Table II.

Table II

| Composition Number | Batch Proportions In Parts By Weight | | Apparent Density (gms/cc) | Crack[1] Rating | Corrosion[2] Resistance |
|---|---|---|---|---|---|
| 1 | Alumina | 100.0 | 2.95 | 28 | 53 |
|   | Silica Sand | 0 | | | |
|   | Boric Oxide | 0 | | | |
| 2 | Alumina | 99.0 | 3.79 | 20 | 150 |
|   | Silica Sand | 1.0 | | | |
|   | Boric Oxide | 0 | | | |
| 3 | Alumina | 99.0 | 3.57 | 20 | 170 |
|   | Silica Sand | 0 | | | |
|   | Boric Oxide | 1.0 | | | |
| 4 | Alumina | 99.0 | 3.70 | 0–5 | 85 |
|   | Silica Sand | 0.5 | | | |
|   | Boric Oxide | 0.5 | | | |
| 5 | Alumina | 98.5 | 3.18 | 20 | 220 |
|   | Silica Sand | 0.5 | | | |
|   | Boric Oxide | 1.0 | | | |
| 6 | Alumina | 98.5 | 3.43 | 20 | 300 |
|   | Silica Sand | 1.0 | | | |
|   | Boric Oxide | 0.5 | | | |
| 7 | Alumina | 98.0 | 3.14 | 20 | 340 |
|   | Silica Sand | 1.0 | | | |
|   | Boric Oxide | 1.0 | | | |
| 8 | Alumina | 99.0 | 3.75 | 30 | 65 |
|   | Silica Sand | 0.5 | | | |
|   | Zirconia | 0.5 | | | |
| 9 | Alumina | 99.0 | 3.49 | 44 | 104 |
|   | Boric Oxide | 0.5 | | | |
|   | Zirconia | 0.5 | | | |
| 10 | Alumina | 99.0 | 3.70 | 20 | 71 |
|   | Silica Sand | 0.5 | | | |
|   | Calcium Oxide | 0.5 | | | |
| 11 | Alumina | 99.0 | 3.74 | 20 | 76 |
|   | Silica Sand | 0.5 | | | |
|   | Magnesia | 0.5 | | | |

[1]Crack Rating - A value of zero indicates no cracking observed in the refractories sampled.
[2]Values shown are factors indicating metal line cuts, according to corrosion tests as described in ASTM C622-68. A value of 100 is assigned to a uniform standard, with a value of zero representing maximum corrosion resistance.

The adverse effect of bulk density of the refractory castings as a function of the presence of the oxides of metals in Group I of the periodic table of the elements is shown in Table III.

Table III

| Composition[1] | Total $R_2O$ By Weight %[2] | Bulk Density[3] |
|---|---|---|
| 12 | 0.84 | 3.52 |
| 13 | 0.80 | 3.55 |
| 14 | 0.75 | 3.64 |
| 15 | 0.67 | 3.67 |
| 16 | 0.60 | 3.71 |
| 17 | 0.54 | 3.72 |
| 18 | 0.10 | 3.75 |

[1]For all tests, the basic refractory composition before $R_2O$ addition comprised 99 weight percent alumina, 0.5 weight percent silica sand and 0.5 weight percent boric oxide.
[2]$R_2O$ denotes $H_2O$, $Na_2O$, $Li_2O$ and other Group I metal oxides.
[3]Bulk density values were obtained from 9 inch × 4-½ inch × 2-½ inch brick, including the shrinkage void formed during solidification.

Figure 2:
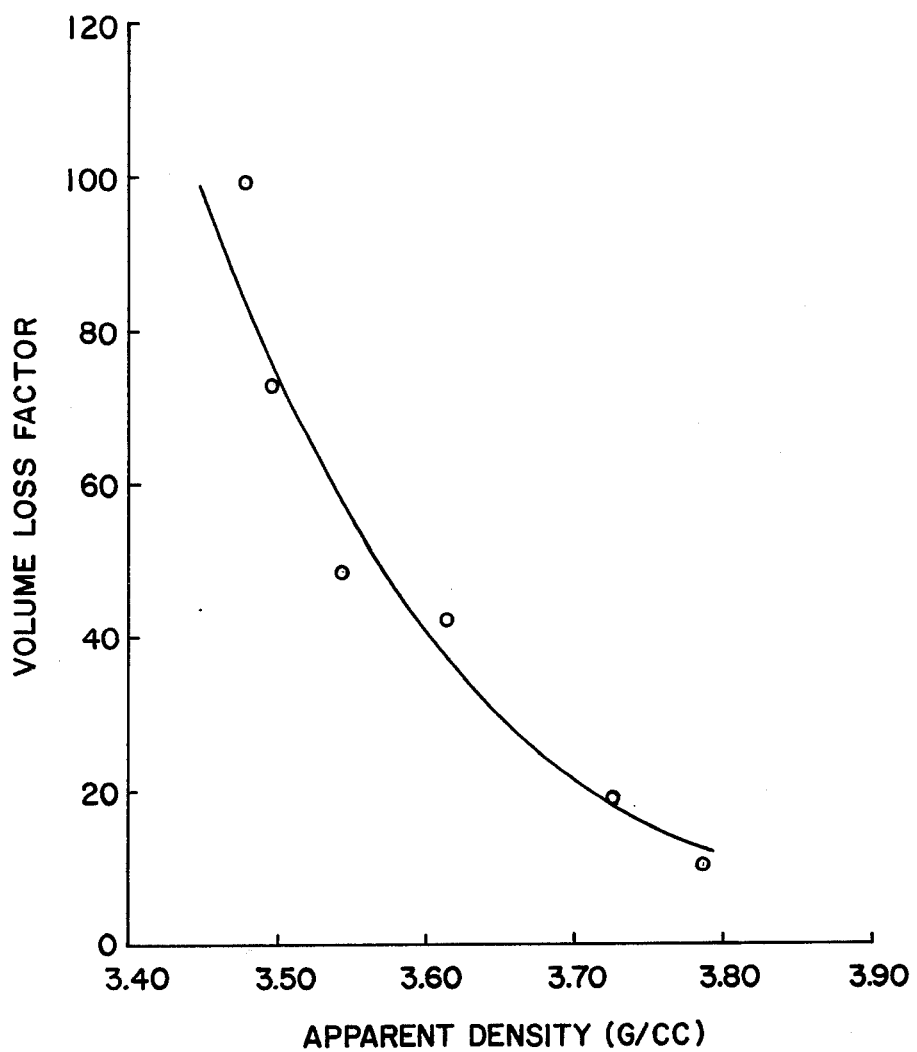
FIG. 2 is a graph showing the relationship between corrosion loss and refractory bulk density.

In conjunction with Table III, FIG. 2 shows the critical relationship between corrosion resistance and bulk or apparent density which in turn is dependent on the amount of Group I metal oxides present as impurities. It should be emphasized that even a small decrease in the bulk or apparent density indicates a definite weakness in the final refractory article. This is shown in FIG. 2 where the volume loss factor indicates the relative quantity of refractory corroded away during testing.

The preferred refractory microstructure is a unique composite in that it is composed of two condensed phases. The reinforcing phase is an intimate network of corundum crystallites. The matrix phase is a thin film of aluminum borosilicate glass. The amount of glass is critical to the development of maximum strength and corrosion resistance of the composite. Insufficient glass is formed when the combined amounts of boric oxide and silica are less than 0.5 weight percent. This prevents the formation of a continuous film surrounding the corundum and thus permits corundum-corundum direct bonding. The latter leads to high intercrystalline stresses during cooling or heating of the material due to the high thermal expansion anisotropy of corundum.

Excessive glass destroys short range ordering in the glass film between adjacent crystallites of corundum and thus the mechanical properties of the composite will more closely approach those of the glass itself. This condition is manifest when the addition of modifying oxides exceeds 2.0 weight percent. Furthermore, the nature of the glass itself is extremely critical. Composition and impurities will strongly effect the viscosity, viscoelasticity, thermal expansion and stability of the glass. It has been observed that when the ratio of boric oxide to silica approaches 0.5, mullite crystallizes out of the glass more easily during heat treatment to 1200°–1500°C as compared to its behavior when the ratio is 0.7:0.9. Conversely, when the ratio is greater than 1.0, as mentioned before, the crystal habit of the corundum is adversely effected. When the quantity of glass exceeds that required to just form a continuous film surrounding the corundum, the corrosion resistance and mechanical strength degrade rapidly.

The present invention therefore combines an intimate arrangement of corundum crystallites and a thin continuous bonding film of an isotropic aluminum borosilicate glass. Such as intimate and homogeneous distribution of the desired crystalline morphology and glass matrix in the cast refractory article, can be achieved only by solidification from a relatively high purity melt comprising at least 99.5 weight percent of the combination of alumina, silica and boric oxide. This composite, for example, may be likened to the more well-known fiberglass-resin composites in which the intimate mixture of two dissimilar but compatible materials result in one material which possesses more desirable mechanical and thermal properties than either of the materials alone.

The refractories of the invention may be made by fusing the raw batch of material in a suitable furnace such as an arc-furnace as for instance that described in U.S. Pat. Nos. 929,917 and 1,615,750, this type of furnace being commonly used to fuse alumina containing abrasive materials. In carrying out the fusion, the furnace may consist of a water-cooled iron or steel shell, having no other lining than that built up by the material being fused as it is fed into the furnace. Fusion is effected initially by the heat from graphite starting rods between the tips of two or more graphite electrodes. After sufficient molten material is formed around the starting rods, they are removed and the electricity flows through the molten oxide. The batch is continually fed in and the electrodes raised, as the quantity of molten material increases. When a sufficient amount of melt is produced, the molten oxide is poured into graphite or water-cooled iron molds by tilting the furnace. It is extremely important to avoid contamination of the melt by carbon from the starting rods, electrodes or any other source. Thus, one must remove the starting rods as soon as possible and avoid submergence of the electrodes.

The molded articles are left in the mold for a brief period of time depending on the volume and surface area of casting. Once a solidified outer layer of refractory forms, the molds may be removed. The molded articles are then placed in a container and buried in a lightweight refractory powder, which insulates the articles from rapid cooling; or they may be placed in a hot kiln for controlled cooling. This annealing procedure is critical to the successful recovery of crack-free refractory articles.

What is claimed is:

1. A fused-cast refractory article comprising crystals of corundum bonded by a refractory aluminum borosilicate glass, said article comprising about 98 to about 99 weight percent alumina, about 0.3 to about 0.7 weight percent boric oxide and about 0.4 to about 0.9 weight percent silica, the ratio of boric oxide to silica being from 0.4 to 1.5.

2. A fused-cast refractory article according to claim 1 consisting essentially of 99 weight percent alumina, 0.5 weight percent boric oxide and 0.5 weight percent silica.

3. A fused-cast refractory article according to claim 1 in which the crystals of corundum are interlocking.

4. A fused-cast refractory article according to claim 3 in which the refractory may contain up to about 0.3 weight percent of constituents selected from the group consisting of oxides of hydrogen, lithium, sodium, potassium, calcium, magnesium, titanium, chromium, iron and zirconium.

* * * * *